(12) United States Patent
Suzuki (10) Patent No.: US 6,891,164 B2
(45) Date of Patent: May 10, 2005

(54) RADIATION IMAGE SENSOR AND SCINTILLATOR PANEL

(75) Inventor: Takaharu Suzuki, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 213 days.

(21) Appl. No.: 10/169,991

(22) PCT Filed: Jan. 11, 2001

(86) PCT No.: PCT/JP01/00089

§ 371 (c)(1),
(2), (4) Date: Jul. 12, 2002

(87) PCT Pub. No.: WO01/51951

PCT Pub. Date: Jul. 19, 2001

(65) Prior Publication Data

US 2003/0002625 A1 Jan. 2, 2003

(30) Foreign Application Priority Data

Jan. 13, 2000 (JP) .................................... P2000-004713

(51) Int. Cl.[7] .............................................. G01T 1/24
(52) U.S. Cl. ........................... 250/370.11; 250/370.01; 250/336.1
(58) Field of Search ....................... 250/370.11, 370.01, 250/336.1

(56) References Cited

U.S. PATENT DOCUMENTS

| | | | |
|---|---|---|---|
| 5,132,539 A | 7/1992 | Kwasnick et al. | 250/361 |
| 5,179,284 A | 1/1993 | Kingsley et al. | 250/370.11 |
| 5,208,460 A | 5/1993 | Rougeot et al. | 250/368 |
| 2002/0188197 A1 * | 12/2002 | Bishop et al. | 600/436 |
| 2003/0015665 A1 * | 1/2003 | Suzuki et al. | 250/370.11 |
| 2003/0116716 A1 * | 6/2003 | Homme et al | 250/370.11 |
| 2003/0183749 A1 * | 10/2003 | Tsutsui et al. | 250/214.1 |

FOREIGN PATENT DOCUMENTS

| | | |
|---|---|---|
| EP | 0 633 124 | 1/1995 |
| EP | 0 903 590 A | 3/1999 |
| EP | 1 091 216 | 4/2001 |
| JP | 59-122988 | 7/1984 |
| JP | 1-114780 | 5/1989 |
| JP | 05 060871 | 3/1993 |
| JP | 05 093780 | 4/1993 |
| JP | 5-196742 | 8/1993 |
| JP | 5-242841 | 9/1993 |
| JP | 6-201834 | 7/1994 |
| JP | 7-27863 | 1/1995 |
| JP | 7-174857 | 7/1995 |
| JP | 11-352230 | 12/1999 |
| WO | WO 98/36290 | 8/1998 |
| WO | WO 98/36291 | 8/1998 |
| WO | WO 99 66352 A | 12/1999 |

* cited by examiner

*Primary Examiner*—David Porta
*Assistant Examiner*—Christine Sung
(74) *Attorney, Agent, or Firm*—Morgan, Lewis & Bockius LLP (57) ABSTRACT

A radiation image sensor comprises (1) an image sensor 1 having a plurality of light receiving elements arranged in one or two dimensionally, (2) scintillator 2 having columnar structure formed on the light-receiving surface of this image sensor 1 to convert radiation into light that can be detected by the image sensor 1, (3) a protective film 3 formed so as to cover and adhere to columnar structure of scintillator 2, (4) a frame 6 disposed around the scintillator to set separation distance from the scintillator and fix the protective film onto the image sensor, and (5) a radiation-transmittable plate 4 fixed opposite to the image sensor 1 by the frame 6 to sandwich the protective film 3 therebetween.

23 Claims, 9 Drawing Sheets

RADIATION IMAGE SENSOR AND SCINTILLATOR PANEL

TECHNICAL FIELD

The present invention relates to an image sensor that detects radiation images used in medical and other fields, as well as to a scintillator panel that converts radiation images into visible light images that can be detected by an image sensor.

BACKGROUND ART

X-ray sensitive film has been used in X-ray imaging conventionally employed for medical and industrial purposes, but radiation imaging systems that use a radiation detecting element have become increasingly popular from the standpoint of convenience and durability of the imaging result. In this type of radiation imaging system, two-dimensional image data derived from radiation is obtained as electrical signals using a radiation detecting element having a plurality of pixels, these signals are processed by a processing apparatus and displayed on a monitor. A representative radiation detecting element has a construction in which scintillator is incorporated in light detectors arranged in a one-dimensional or two-dimensional pattern and incident radiation is converted into light such as visible light by this scintillator and detected.

CsI, which is a typical scintillator material, is a moisture-absorbing material that absorbs atmospheric water vapor (moisture) and dissolves. Because the characteristics of the scintillator, particularly the resolution, deteriorate as a result, the scintillator must have a construction whereby they are protected from atmospheric moisture. As a construction whereby scintillator is protected from atmospheric moisture, the technologies disclosed in JP 05-196742A and in JP 05-242841A, as well as in International Publication Nos. WO-98/36290 and WO-98/36291 are known.

DISCLOSURE OF THE INVENTION

However, in the technologies disclosed in JP 05-196742A and in JP 05-242841A, it is not easy to form the anti-moisture construction disclosed therein. The technologies disclosed in International Publication Nos. WO-98/36290 and WO-98/36291, on the other hand, solve these problems, but offer insufficient strength.

Accordingly, an object of the present invention is to provide a radiation image sensor and a scintillator panel that have protective means that offer durability and strength.

In order to achieve this object, the radiation image sensor according to the present invention is characterized in that it comprises of (1) an image sensor comprising a plurality of light receiving elements arranged one or two dimensionally, (2) scintillator having a columnar structure and formed on the light-receiving surface of this image sensor to convert radiation into light including wavelength bands that can be detected by this image sensor, (3) a protective film formed so as to cover these columnar structures of the scintillator and adhere thereto, (4) a frame that is disposed around the scintillator to set a separation distance from the scintillator and fix the protective film onto the image sensor, and (5) a radiation-transmittable plate fixed opposite to the image sensor by the frame to sandwich the protective film therebetween.

On the contrast, the scintillator panel according to the present invention is characterized in that it comprises of (1) a substrate, (2) scintillator having a columnar structure and formed on this substrate to convert radiation into light including wavelength bands that pass through this substrate, (3) a protective film formed so as to cover these columnar structure of the scintillator and adhere thereto, (4) a frame that is disposed around the scintillator to set a separation distance from the scintillator and fix the protective film onto the substrate, and (5) a radiation-transmittable plate fixed opposite to the substrate by the frame to sandwich the protective film therebetween.

The radiation image sensor according to the present invention may comprise a combination of this scintillator panel and a detector that detects the optical image that passes through the substrate.

In the scintillator panel and radiation image sensor according to the present invention, because a protective film is formed so as to cover the scintillator and adhere thereto, the scintillator is well protected from atmospheric moisture. Moreover, because the protective film is covered by the radiation-transmittable plate fixed above the protective film, strength is ensured. Furthermore, because the protective film and the radiation-transmittable plate are fixed by the frame, manufacturing is made easy and the overall strength is increased.

It is preferred that openings be formed in part of the area between the frame and the radiation-transmittable plate. By forming such openings, because the space between the radiation-transmittable plate and the edges of the scintillators is not closed, when thermal processing or the like is carried out during manufacturing, deformation of or damage to the radiation-transmittable plate, the substrate or the image sensor is prevented.

It is furthermore preferred that the radiation-transmittable plate reflect the light emitted by the scintillator. This plate may comprise a metal plate, for example, or may be achieved by forming a reflective film such as a metal film on a radiation-transmittable substrate. Here, it is preferred that the radiation-transmittable substrate comprise a glass, resin or carbon-based substrate.

When the radiation-transmittable plate is made a light-reflecting plate, because the light emitted by the scintillator and redirected toward the radiation incident surface is returned toward the scintillator, the output light intensity of the visible image output by the scintillator is improved.

BEST MODE FOR CARRYING OUT THE INVENTION

The best mode for carrying out the present invention will be explained in detail below with reference to the drawings. To facilitate the comprehension of the explanation, the same reference numerals denote the same parts, where possible, throughout the drawings, and a repeated explanation will be omitted. Furthermore, the dimensions and configurations shown in the drawings are not necessarily accurate or true to scale, and some parts may be enlarged in order to facilitate understanding.

Figure 1:
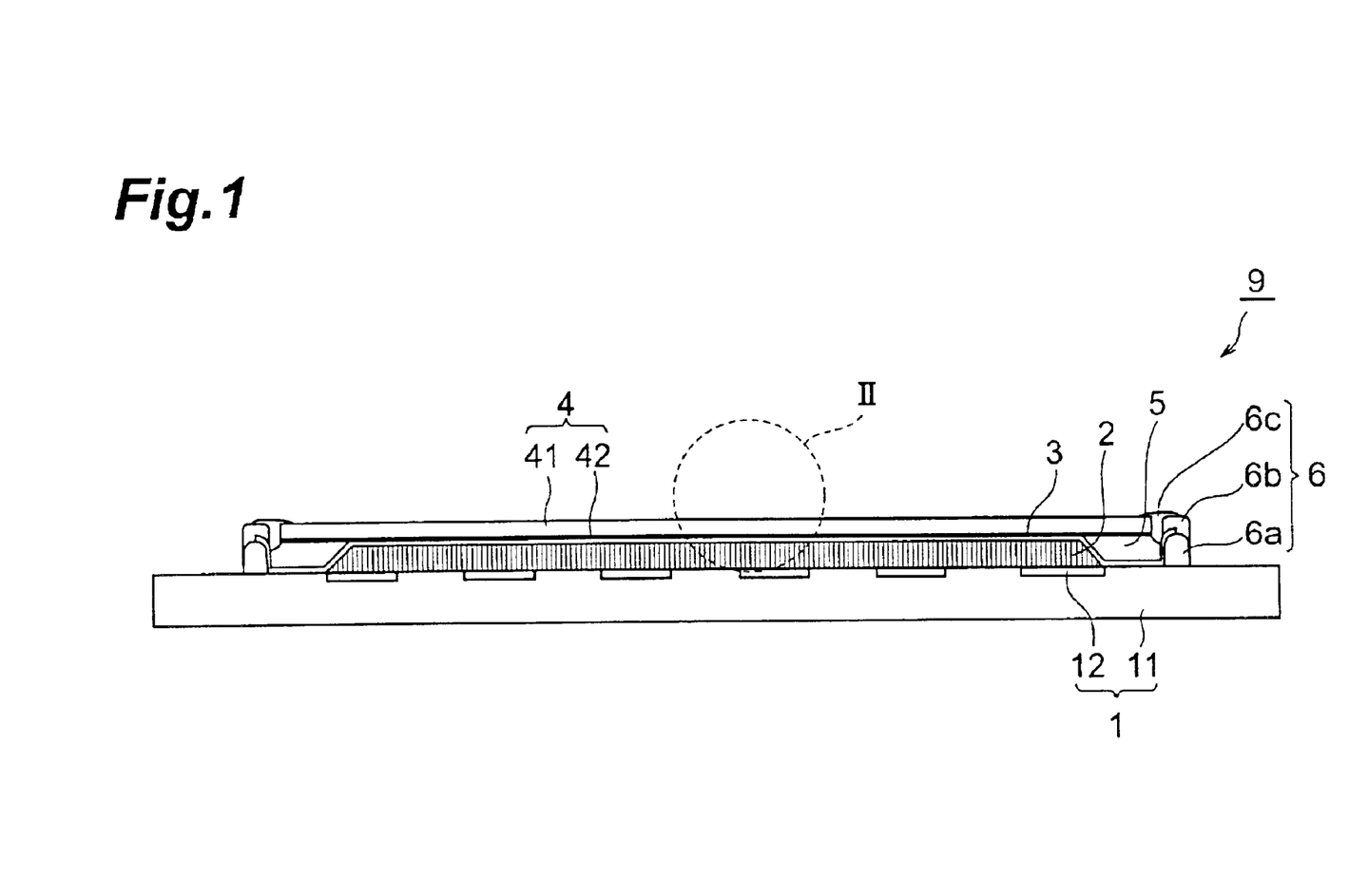
FIG. 1 is a cross-sectional view of a first embodiment of the radiation image sensor according to the present invention.
Figure 2:
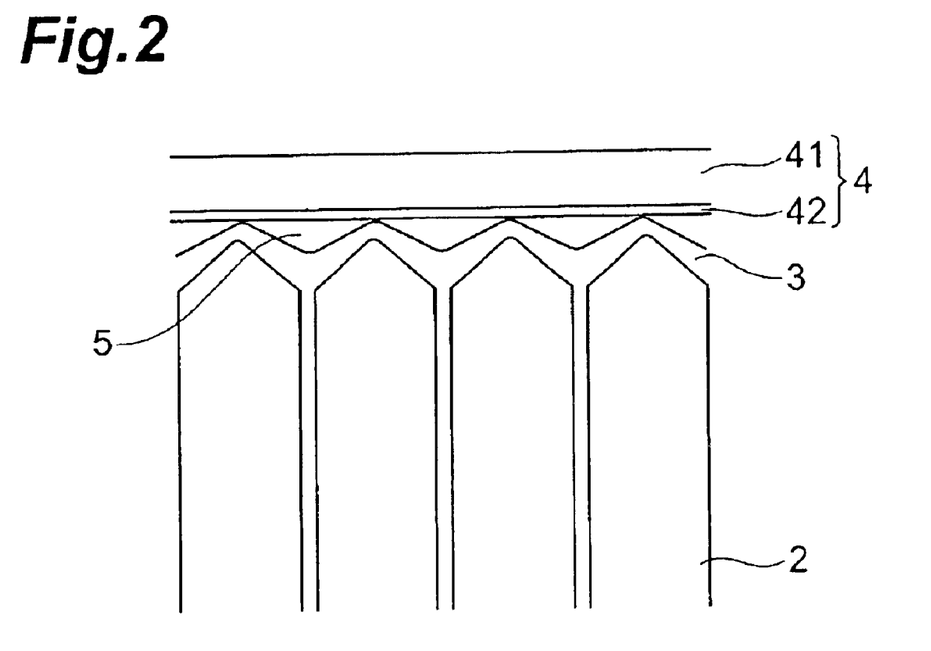
FIG. 2 is an expanded view of the area II indicated in FIG. 1.
Figure 3:
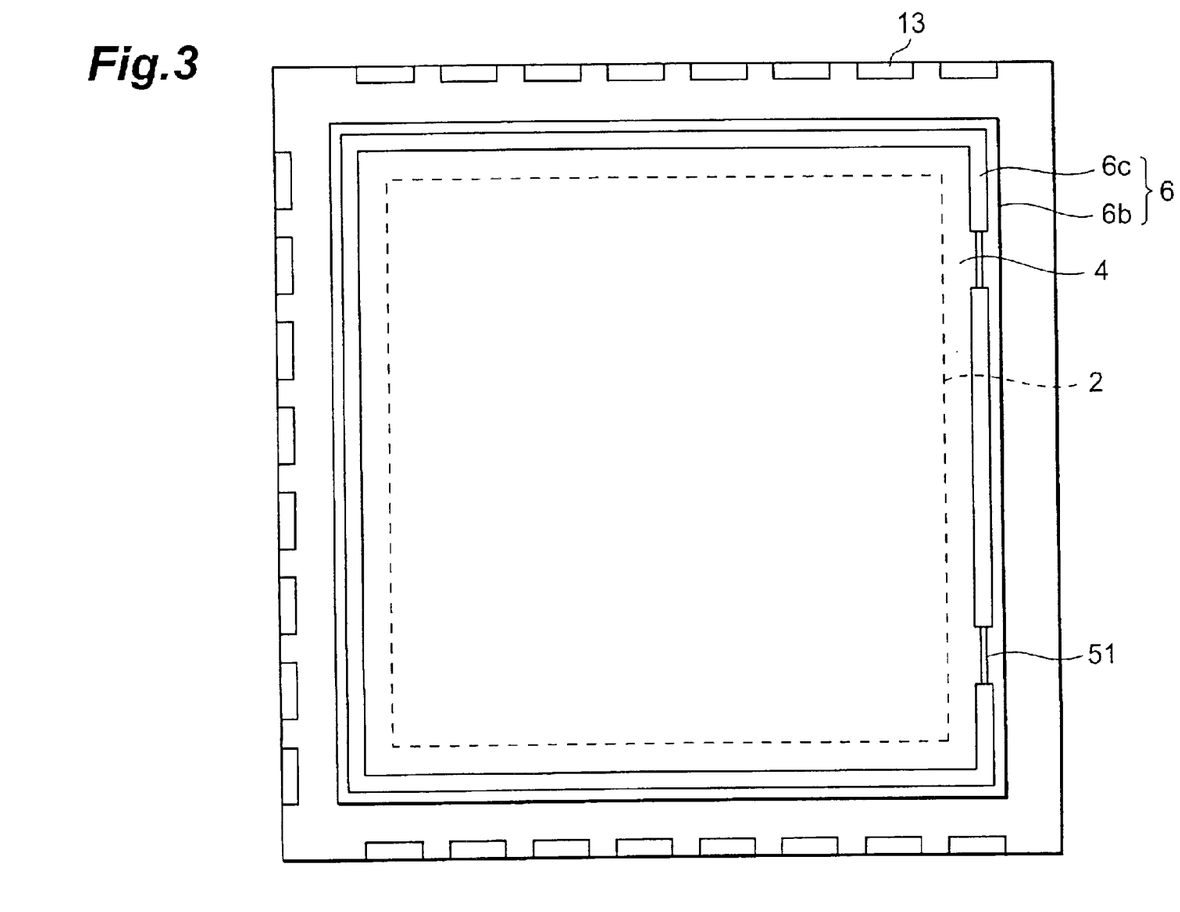
FIG. 3 is a top view of the radiation image sensor shown in FIG. 1.

FIG. 1 is a cross-sectional view of a first embodiment of the radiation image sensor according to the present invention, FIG. 2 is an expanded view of a part thereof, and FIG. 3 is a top view thereof.

The solid imaging element 1 of this radiation image sensor 9 comprises a substrate 11 formed from an insulating material such as glass and a light receiving unit wherein light receiving elements 12 that carry out photoelectric conversion are arranged two-dimensionally on the substrate. These light receiving elements 12 comprise amorphous silicon diodes (PD) or thin film transistors (TFT).

Scintillator 2 having columnar structure to convert incident radiation into light that has prescribed wavelength bands (including not only visible light, but also electromagnetic waves within a prescribed radiation spectrum such as ultraviolet light and infrared rays) are formed on the light receiving unit of the solid imaging element 1. The scintillator 2 may comprise various different materials, but Tl-doped CsI that emits visible light with good photoemission efficiency is preferred. The top of each columnar structure of scintillator 2 is not flat, but is pointed upward, as shown in FIG. 2.

A protective film 3 is formed such that it covers each columnar structure of scintillator 2, resides in the spaces therebetween, and seals the scintillator 2. Accordingly, a fine pattern of protrusions and indentations is formed on the surface of the protective film 3. It is preferred that this protective film 3 comprise a material that is transparent to X-rays and blocks water vapor, such as polyparaxylylene resin (brand name 'Parylene', manufactured by Three Bond), and particularly polyparachlorxylylene (brand name 'Parylene C', also manufactured by Three Bond). A coating of Parylene film offers excellent characteristics as the protective film 3, such as extremely small moisture and gas permeability, a high level of water repellence and chemical resistance, and superior electrical insulation performance even in a thin film, as well as transparency to radiation and visible light rays.

Details regarding Parylene coating are provided in 'Three Bond Technical News' (the Sep. 23, 1992 issue), and its characteristics will be described here.

A Parylene coating can be applied via the chemical vacuum deposition (CVD) method wherein the coating is applied in a vacuum to a supporting member in the same fashion as metal vacuum deposition. This process comprises a step of pyrolyzing a diparaxylylene monomer that comprises the raw material, and rapidly cooling the resulting substance in an organic solvent of toluene or benzene to obtain diparaxylylene referred to as dimer, a step of pyrolyzing this dimer and generating a stable radical paraxylylene gas, and a step of causing the generated gas to be adsorbed by and polymerize with a material to form a polyparaxylylene film having a molecular weight of approximately 500,000.

There are two major differences between Parylene deposition and metal vacuum deposition. First, when Parylene is deposited, the pressure is approximately 10–20 Pa, which is higher than the approximately 0.1 Pa used during metal vacuum deposition, and secondly, the accommodation coefficient for Parylene deposition is two to four digits lower than the accommodation coefficient 1 for metal vacuum deposition. As a result, during deposition, the entire deposition material is first covered by a monomolecular film, and the Parylene is deposited on top of that film. Therefore, a film having no pinholes can be formed with a uniform thickness starting at 0.2 $\mu$m, and a coating can be applied to corners and edge areas, as well as to gaps that have a width on the order of microns and cannot be covered by a liquid coating. Furthermore, because heat processing is not necessary during the coating operation, which can take place at a temperature close to room temperature, the process does not generate curing-induced mechanical stress or heat deformation, and offers superior coating stability. Furthermore, coating can be applied to most solid substances.

A radiation-transmittable plate 4 comprising a radiation-transmittable material 41 coated with a reflective film 42 is placed on the protective film 3 such that the surface of the reflective film 42 (i.e., the reflective surface) faces the protective film 3. Here, the reflective surface runs essentially parallel to the light-receiving surface of the solid imaging element 1. Because the surface of the protective film 3 has the fine protrusions and indentations described above, gaps 5 are formed between the surface of the protective film 3 and the surface of the radiation-transmittable plate 4 (i.e., of the reflective film 42). The radiation-transmittable material 41 may comprise a glass, polyvinyl or other resin, or carbon-based substrate. The reflective film 42 may comprise a metal film or a dielectric multi-layer film formed through deposition, and in the case of a metal film, it is preferred that such film comprise aluminum deposition film or other film having a high light reflectance.

The radiation-transmittable plate 4 is fixed to the surface of the solid imaging element 1 by a frame 6. This frame 6 is set separation distance from the side surfaces of the scintillator 2 such that it surrounds the scintillator 2, as shown in FIGS. 1 and 3. The frame 6 comprises three layers 6a through 6c arranged in that order from the side nearest the solid imaging element 1. The protective film 3 is sandwiched between the first layer 6a and the second layer 6b, such that the protective film 3 is fixed by its own edges. It is preferred that this frame 6 comprise KJR651 or KE4897 silicon resin manufactured by Shinetsu Chemical, TSE397 silicon resin manufactured by Toshiba Silicon, or DYMAX625T silicon resin manufactured by Sumitomo 3M. These materials are widely used in surface processing to provide mechanical or electrical protection for semiconductor elements, and offer tight adhesion to the protective film 3. Alternatively, a resin having good adhesion to the protective film 3 such as World Rock No. 801-Set 2 acrylic adhesive (70,000 cP type) manufactured by Kyoritsu Chemical Mfg. Co., Ltd. may be used. This resin adhesive has desirable characteristics: it cures in approximately 20 seconds upon the irradiation of 100 mW/cm² ultraviolet light, the effective coating is flexible and sufficiently strong, offers superior resistance to moisture, water, electrical corrosion and migration, and has good adhesion characteristics, particularly in regard to glass and plastic. Naturally, appropriate materials, resins and adhesives may be selected individually for each layer and combined: a metal frame or glass frame may be used for the material of the first layer 6a and the second layer 6b, or the first layer 6a may be integrally formed with the solid imaging element 1.

The third layer 6c of the frame 6 serves the function of connecting the first layer 6a and the second layer 6b of the frame 6 to the radiation-transmittable plate 4. It is not necessary that the third layer 6c cover the entire periphery of the radiation-transmittable plate 4. For example, where electrode areas 13 are located along two edges thereof that are in close proximity to the solid imaging element 1, it is acceptable if no third layer 6c is formed along one edge of the radiation-transmittable plate 4 at which no electrode area 13 is formed, and an opening 51 that connects to the interior spaces 5 is formed at one or more locations along such edge.

The presence of the radiation-transmittable plate 4 prevents damage to the thin protective film 3 and enables it to be reliably protected, and also ensures the strength of the radiation image sensor. As a result, the sensor is easy to handle.

Figure 4A:
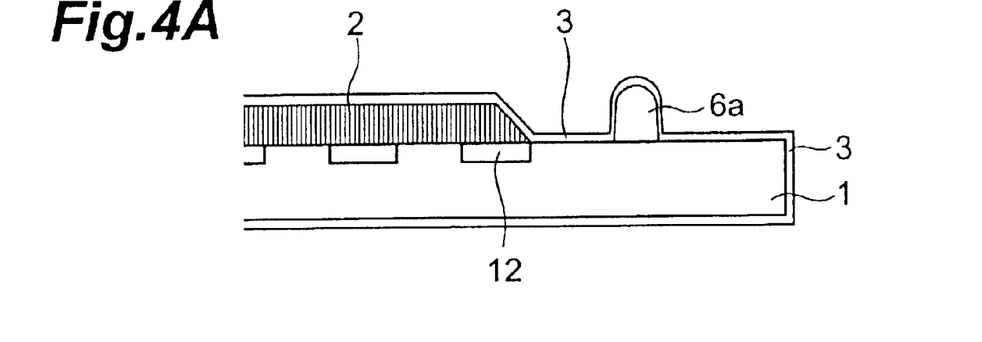
FIGS. 4A through 4D are drawings to explain the making process for the image sensor shown in FIG. 1.

The making process of this embodiment will now be explained with reference to FIGS. 1 through 3 and FIGS. 4A through 4D. First, as shown in FIG. 4A, scintillator 2 is formed on the light-receiving surface of the solid imaging element 1 (the side on which the light receiving elements 12 are formed) by growing columnar crystal of Tl-doped CsI to a thickness of 600 μm via the deposition method.

Subsequently, after the solid imaging element 1 on which the scintillator 2 are deposited undergoes annealing at 200–210° C., UV-cured resin is applied in a frame configuration around the scintillator 2, and the resin is cured through the irradiation of UV light to form the first layer 6a of the frame 6. An automatic X-Y coating apparatus such as the AutoShooter 3 made by Iwashita Engineering, for example, may be used during this frame formation. It is preferred that the surface of the frame 6 undergo roughness processing during this formation operation in order to improve adhesion to the protective film 3 formed on the top thereof. Such roughness processing may comprise the formation of lines or numerous small depressions.

The CsI that forms the scintillator 2 is highly moisture-absorbent, and if exposed to the atmosphere as is, absorbs atmospheric water vapor and dissolves. Accordingly, in order to prevent this, Parylene is deposited to a thickness of 10 μm using the CVD method so as to cover the solid imaging element 1, thereby forming a protective film 3. Gaps are formed between the columnar crystal of CsI as shown in FIG. 2, but the Parylene enters these narrow gaps. As a result, a protective film 3 is formed on the scintillator 2 while adhering thereto. Furthermore, as a result of this Parylene coating, a fine thin film coating having an essentially uniform thickness is obtained on the surface of the scintillator 2 having protrusions and indentations. Moreover, because forming the Parylene coating via the CVD method requires less of a vacuum than metal deposition and can be performed at room temperature, processing is easy.

Figure 4B:
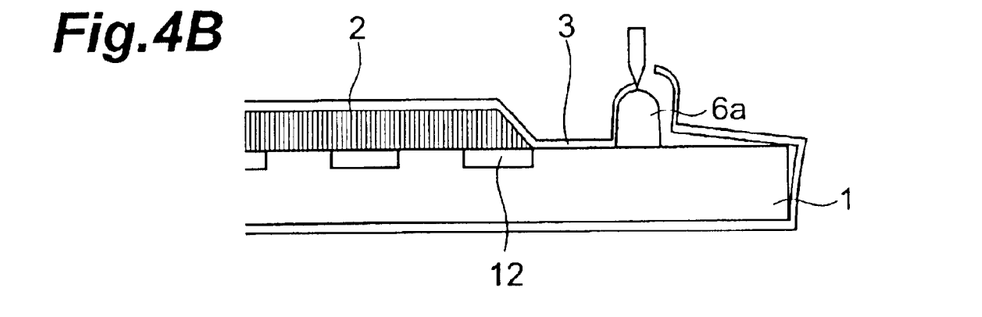

The protective film 3 formed as described above is then cut along the length of the first layer 6a of the frame 6 using a cutter, as shown in FIG. 4B. Because protrusions are formed by the first layer 6a of the frame 6, it is easy to determine the cutting location, and because there is a margin equivalent to the thickness of the first layer 6a of the frame 6 when the cutter is inserted, there is no danger of damaging the solid imaging element 1 located below the frame 6, making processing simpler and improving the manufacturing yield. The protective film 3 that is formed outside the cutting area and on the side opposite the incident light surface is then removed.

Figure 4C:
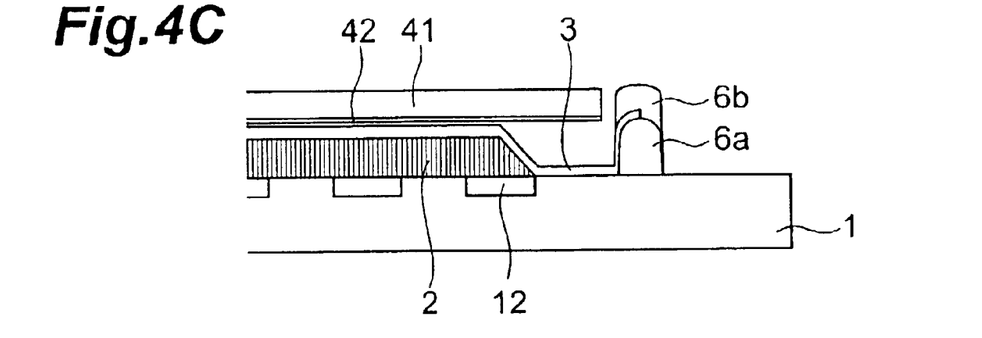

The second layer 6b of the frame 6 is then formed by applying acrylic resin to cover the edges of the protective layer 3 and the exposed first layer 6a of the frame 6 and curing it via UV irradiation, as shown in FIG. 4C. When this is done, the second layer 6b is formed to a height that is approximately 0.5 mm higher than the top surface of the scintillator 2.

By sandwiching the protective film 3 between the first layer 6a and second layer 6b of the frame 6 in this fashion, the adhesion of the protective film 3 over the solid imaging element 1 is further improved, which is desirable. As a result, because the scintillator 2 is completely closed off by the protective film 3, moisture can be reliably prevented from coming into contact with the scintillator 2, and a decrease in resolution of the solid imaging element 1 due to moisture-absorption based deterioration in the scintillator 2 can be prevented.

Figure 4D:
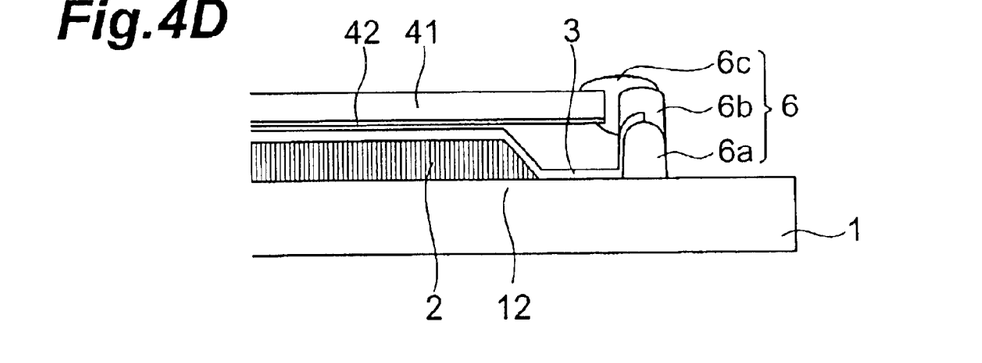

Next, a reflective plate 4 comprising a radiation-transmittable material 41, which is a 0.4 mm-thick glass plate, and a reflective film 42 formed on one surface thereof by vapor deposition of aluminum to a 1000 Å thickness, is placed on the solid imaging element 1 such that the reflective surface thereof, i.e., the surface on which the reflective film 42 is formed, faces the protective film 3, as shown in FIG. 4C. When this is done, it is preferred that the light-receiving surface of the solid imaging element 1 and the reflective surface of the reflective film 42 run essentially parallel to each other, and that the protective film 3 and the reflective film 42 be located such that they are in contact or in close proximity to each other. A third layer 6c is formed by applying UV-cured resin between the reflective plate 4 and the second layer 6b of the frame 6 and curing it through the irradiation of UV light, whereby the radiation-transmittable plate 4 is fixed to the solid imaging element 1, as shown in FIG. 4D. When this is done, openings 51 are formed by not applying UV-cured resin to a part of the edge of the radiation-transmittable plate 4 located on a side of the solid imaging element 1 at which electrode areas 13 are not present. The radiation image sensor 9 of this embodiment shown in FIG. 1 is obtained in this fashion.

Where heat processing must be performed with regard to the radiation image sensor 9 made as described above, or where this sensor is used in an environment subject to fluctuations in temperature, because air can freely enter and exit the spaces 5 via the openings 51, deformation in the constituent members of the radiation image sensor 9 such as the radiation-transmittable plate 4 due to expansion or contraction of the air inside the interior spaces 5 can be inhibited.

The operation of this embodiment will now be explained. The X-rays (radiation) incident on the incident light surface, i.e., the top surface in FIG. 1 and FIG. 2, pass through the radiation-transmittable plate 4 (the radiation-transmittable material 41 and the reflective film 42), the spaces 5 and the protective film 3, and reach the scintillator 2. These X-rays are absorbed by the scintillator 2, and visible light rays are emitted in proportion to the amount of X-rays. Part of the emitted visible light rays that are redirected toward the X-ray incidence direction are reflected at the boundary surface of the protective film 3 and return to the scintillator 2. The visible light released through the protective film 3 is reflected by the reflective film 42 and returns to the scintillator 2. As a result, almost all of the visible light emitted by the scintillator 2 enters the light receiving elements 2. Consequently, efficient, high-sensitivity measurement can be performed.

Electrical signals corresponding to the amount of visible light are generated by each light receiving element 12 via photoelectric conversion and are accumulated at fixed intervals. Because the amount of visible light corresponds to the amount of incident X-ray radiation, the electrical signals accumulated in each light receiving element 12 correspond to the amount of incident X-ray radiation, and an image signal corresponding to the X-ray image is obtained. The image signals accumulated in the light receiving elements 12 are transmitted externally, and through processing of these image signals via a prescribed processing circuit, an X-ray image can be displayed.

Figure 5A:
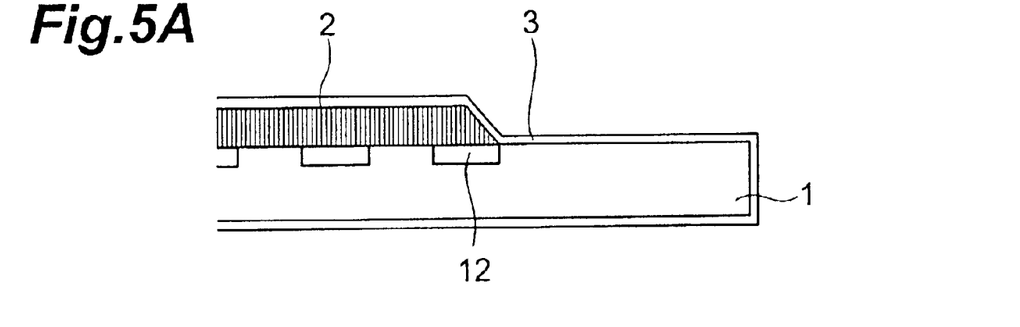
FIGS. 5A through 5D are drawings to explain a second embodiment of the radiation image sensor according to the present invention and the making process thereof.
Figure 5B:
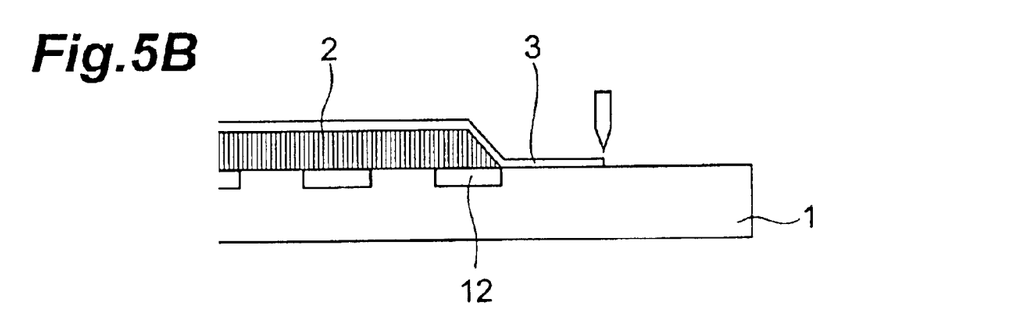
Figure 5C:
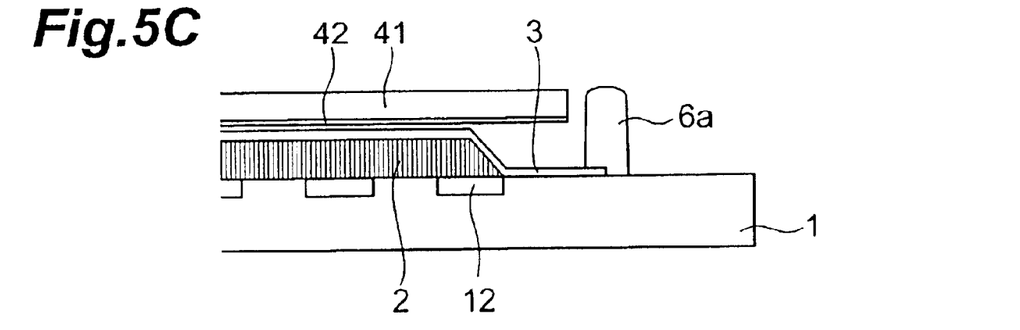
Figure 5D:
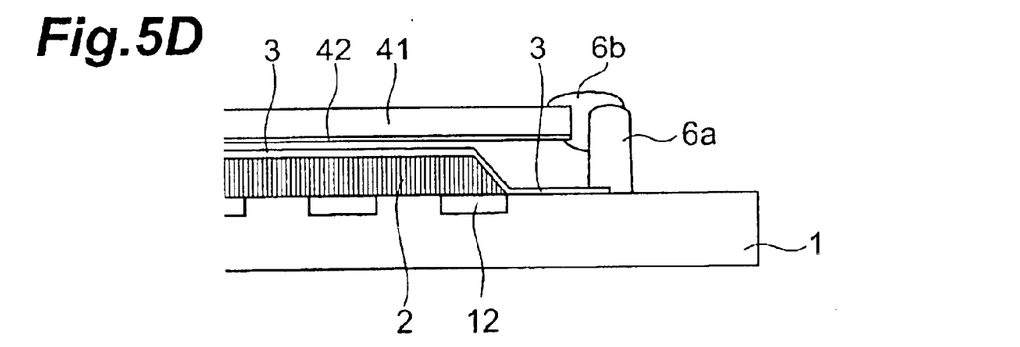

A second embodiment of the radiation image sensor according to the present invention is shown in FIGS. 5A through 5C. This radiation image sensor differs from the first embodiment shown in FIG. 1 in that the end areas of the protective film 3 are fixed to the surface of the solid imaging element 1 and the edges are fixed by the frame 6 from above, as shown in FIG. 5D.

The making method therefor is identical to that for the first embodiment up to and including the deposition of the scintillator 2 on the solid imaging element 1 and the performance of the annealing process. Subsequently, a 10 μm-thick coating of Parylene is applied via the CVD method such that it covers the solid imaging element 1, and a protective film 3 is thereby formed, as shown in FIG. 5A. The details regarding the formation of the protective film 3 are identical to those discussed in connection with the first embodiment, and will not be described here.

The protective film 3 formed as described above is then cut outside the scintillator 2 using a cutter, as shown in FIG. 5B. The protective film 3 that is formed outside the cutting areas and on the side opposite the incident light surface is then removed.

UV-cured resin is then applied in a frame configuration along the outer periphery of the protective film 3, and the resin is cured through the irradiation of UV light to form the first layer 6a of the frame 6. An automatic X-Y coating apparatus such as the AutoShooter 3 made by Iwashita Engineering, for example, may be used during this frame formation. When this is done, the first layer 6a is formed to a height that is approximately 0.5 mm higher than the top surface of the scintillator 2.

By pressing the edges of the protective film 3 using the first layer 6a of the frame 6 in this fashion, the adhesion of the protective film 3 over the solid imaging element 1 is further improved, which is desirable. As a result, because the scintillator 2 is completely closed off by the protective film 3, moisture can be reliably prevented from coming into contact with the scintillator 2, and a decrease in resolution of the solid imaging element 1 due to moisture-absorption based deterioration in the scintillator 2 can be prevented.

Next, a radiation-transmittable plate 4 comprising a radiation-transmittable material 41, which is a 0.4 mm-thick glass plate, and a reflective film 42 formed on one surface thereof by vapor deposition of aluminum to a 1000 Å thickness, is placed on the solid imaging element 1 such that the reflective surface thereof, i.e., the surface on which the reflective film 42 is formed, faces the protective film 3, as shown in FIG. 5C. When this is done, the light-receiving surface of the solid imaging element 1 and the reflective surface of the reflective film 42 run essentially parallel to each other, and the protective film 3 and the reflective film 42 are in contact or in close proximity to each other. A second layer 6b is formed by applying UV-cured resin between the reflective plate 4 and the first layer 6a of the frame 6 and curing it through the irradiation of UV light, whereby the reflective plate 4 is fixed to the solid imaging element 1, as shown in FIG. 5D.

Naturally, in this embodiment as well, the first layer 6a is not limited to resin, and the frame may be made of metal, glass, or the like. In this case, it is preferred that the first layer 6a be bonded to the solid imaging element 1 via adhesive or resin.

Figure 6A:
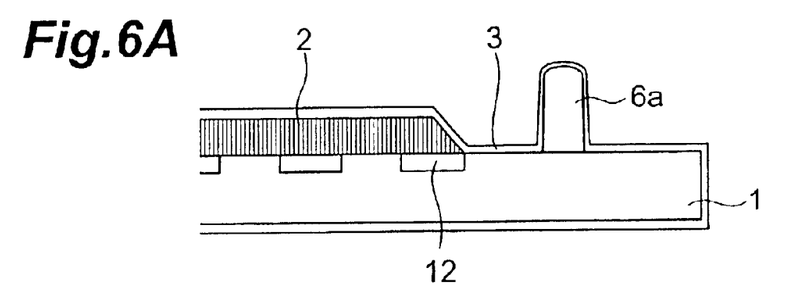
FIGS. 6A through 6D are drawings to explain a third embodiment of the radiation image sensor according to the present invention and the making process thereof.
Figure 6B:
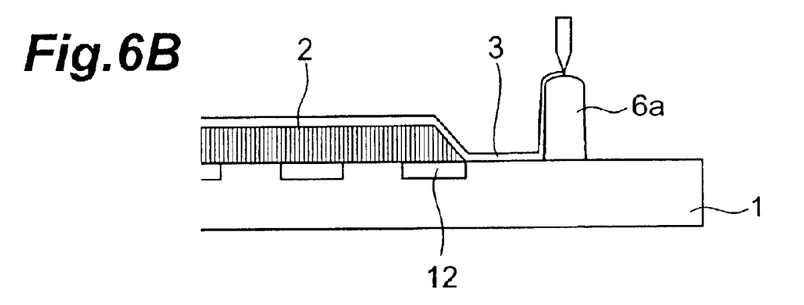
Figure 6C:
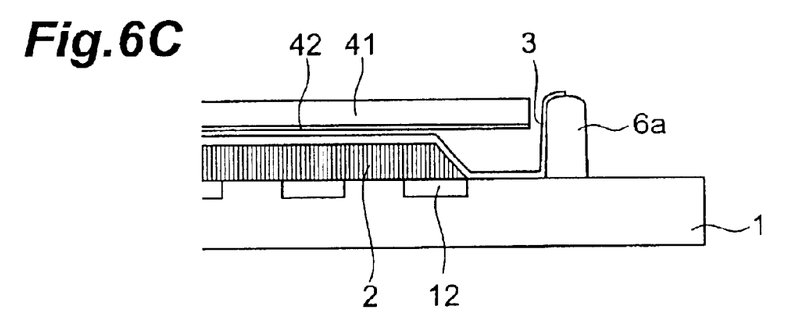
Figure 6D:
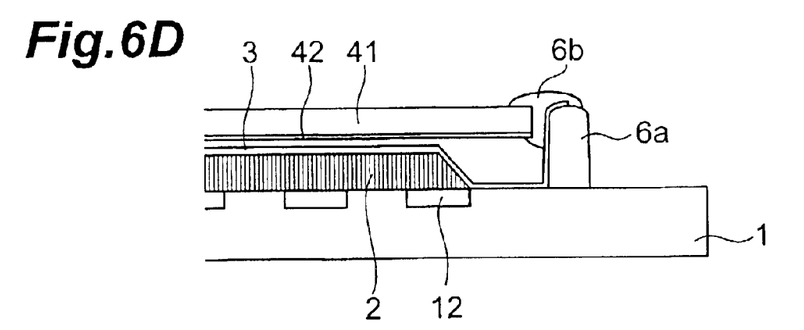

FIGS. 6A through 6D are drawings to explain the making process for a third embodiment of the radiation image sensor according to the present invention. This radiation image sensor differs from the first embodiment shown in FIG. 1 in that the first layer 6a of the frame 6 is higher than the first embodiment, and the radiation-transmittable plate 4 is fixed to the second layer 6b located on the first layer 6a, as shown in FIG. 6D.

The making method therefor is identical to that for the first embodiment up to and including the deposition of the scintillator 2 on the solid imaging element 1 and the performance of the annealing process. The first layer 6a of the frame 6 is then formed as it is in the first embodiment, but this time, the first layer 6a is formed such that it is 0.5 mm higher than the top surface of the scintillator 2. The protective film is then formed using parylene in the same manner as in the first embodiment (see FIG. 6A).

The protective film 3 formed as described above is then cut along the length of the first layer 6a of the frame 6 using a cutter, as shown in FIG. 6B, and the protective film 3 that is formed outside the cutting areas and on the side opposite the incident light surface is then removed. The details regarding this process are identical to those discussed in connection with the first embodiment, and will not be described here.

Next, a radiation-transmittable plate 4 comprising a radiation-transmittable material 41, which is a 0.4 mm-thick glass plate, and a reflective film 42 formed on one surface thereof by vapor deposition of aluminum to a 1000 Å thickness, is placed on the solid imaging element 1 such that the reflective surface thereof, i.e., the surface on which the reflective film 42 is formed, faces the protective film 3, as shown in FIG. 6C. When this is done, the light-receiving surface of the solid imaging element 1 and the reflective surface of the reflective film 42 run essentially parallel to each other, and the protective film 3 and the reflective film 42 are in contact or in close proximity to each other.

The second layer 6b of the resin frame 6 is then formed by applying acrylic resin to cover the edges of the protective layer 3 and the exposed first layer 6a of the frame 6, as well as such that it fills the gaps between and the radiation-transmittable plate 4, and curing it via UV irradiation, as shown in FIG. 6D. In this way, the radiation-transmittable plate 4 is fixed to the solid imaging element 1. The radiation image sensor of this embodiment is obtained in this fashion.

By sandwiching the protective film 3 between the first layer 6a and second layer 6b of the resin frame 6 in this manner, the adhesion of the protective film 3 over the solid imaging element 1 is further improved, which is desirable. As a result, because the scintillator 2 is completely closed off by the protective film 3, moisture can be reliably prevented from coming into contact with the scintillator 2, and a decrease in resolution of the solid imaging element 1 due to moisture-absorption based deterioration in the scintillator 2 can be prevented.

It is also acceptable if the first layer 6a in this embodiment is formed beforehand as an integral part of the substrate of the solid imaging element 1, or if it is formed by bonding a metal frame or a glass frame.

Figure 7:
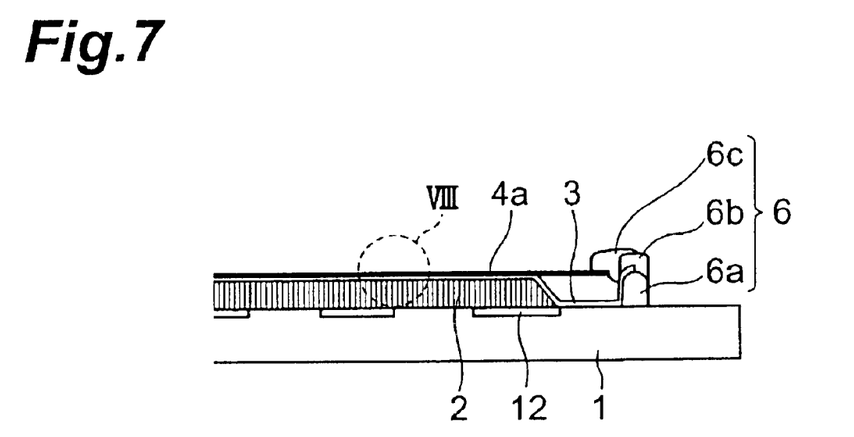
FIG. 7 is a cross-sectional view of a fourth embodiment of the radiation image sensor according to the present invention.
Figure 8:
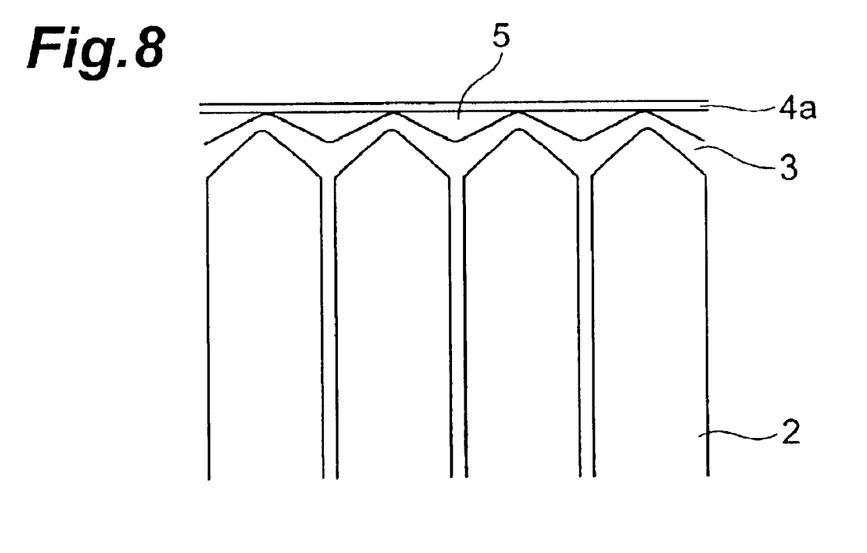
FIG. 8 is an expanded view of the area VIII indicated in FIG. 7.

A fourth embodiment of the radiation image sensor according to the present invention is shown in FIG. 7 and FIG. 8. This radiation image sensor uses a metal plate 4a comprising a single member as the radiation-transmittable plate instead of the radiation-transmittable plate 4 of the first embodiment shown in FIGS. 1 and 2. For this radiation-transmittable plate 4a, any member that is either reflective or light-transmittable may be used. The radiation-transmittable plate 4a may be either a reflective member or light-transmittable transmittable member. As a reflective member, an aluminum sheet having a thickness of approximately 0.05 mm, for example, may be used. Where a metal plate is used, the apparatus may be made thinner. Where a light-transmittable member is used, on the other hand, it is easier to confirm the positions of the light receiving elements.

Figure 9:
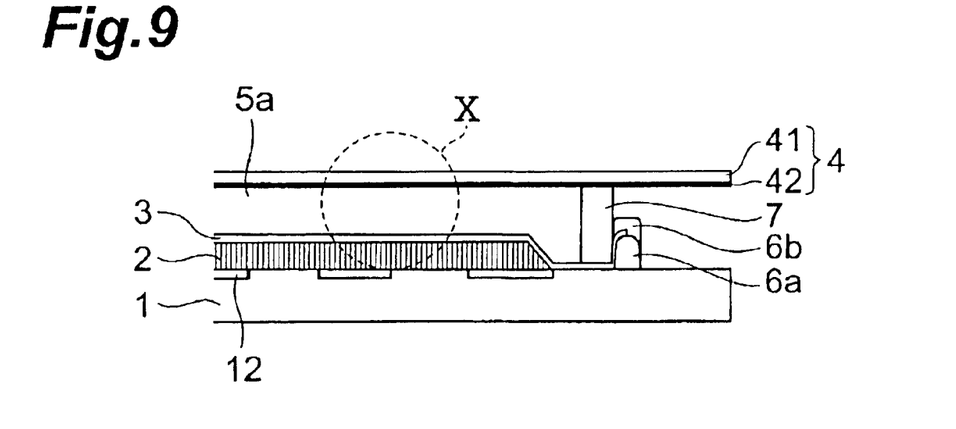
FIG. 9 is a cross-sectional view of a fifth embodiment of the radiation image sensor according to the present invention.
Figure 10:
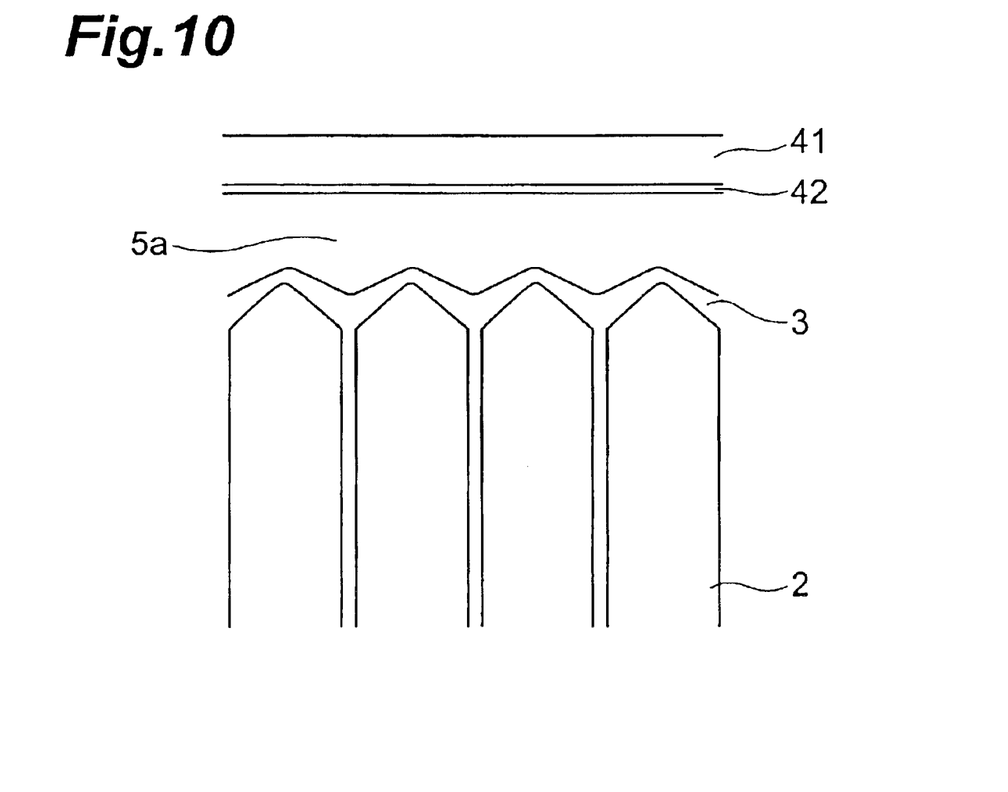
FIG. 10 is an expanded view of the area X indicated in FIG. 9.

A fifth embodiment of the radiation image sensor according to the present invention is shown in FIGS. 9 and 10. While in the first embodiment shown in FIGS. 1 and 2, the radiation-transmittable plate 4 was placed such that it was in contact with or in very close proximity to the protective film 3, in this radiation image sensor, there is a substantial distance between the radiation-transmittable plate 4 and the protective film 3. A spacer 7 is used to place the radiation-transmittable plate 4 at a distance from the protective film 3. This spacer 7 also plays a role to prevent the protective film 3 from being peeled off from the outer periphery. Naturally, it is acceptable if the reflective plate 4 is set a separated distance from the protective film 3 by increasing the height of the resin frame 6, without using a spacer 7. The spaces 5a created by separating the radiation-transmittable plate 4 from the protective film 3 may be made a layer of air or filled with a particular gas, or may be depressurized or made a vacuum. Naturally, openings 51 may be formed that connect the spaces 5a to the outside, as described with reference to the first embodiment.

It is acceptable if a moisture-absorbent material is disposed in the spaces 5a outside the scintillator 2 and the light receiving elements 12 of the solid imaging element 1. By placing a moisture-absorbent material inside the spaces 5a, the humidity inside the spaces 5a can be maintained at or below a prescribed level, and the moisture-prevention effect can be further increased.

Figure 11:
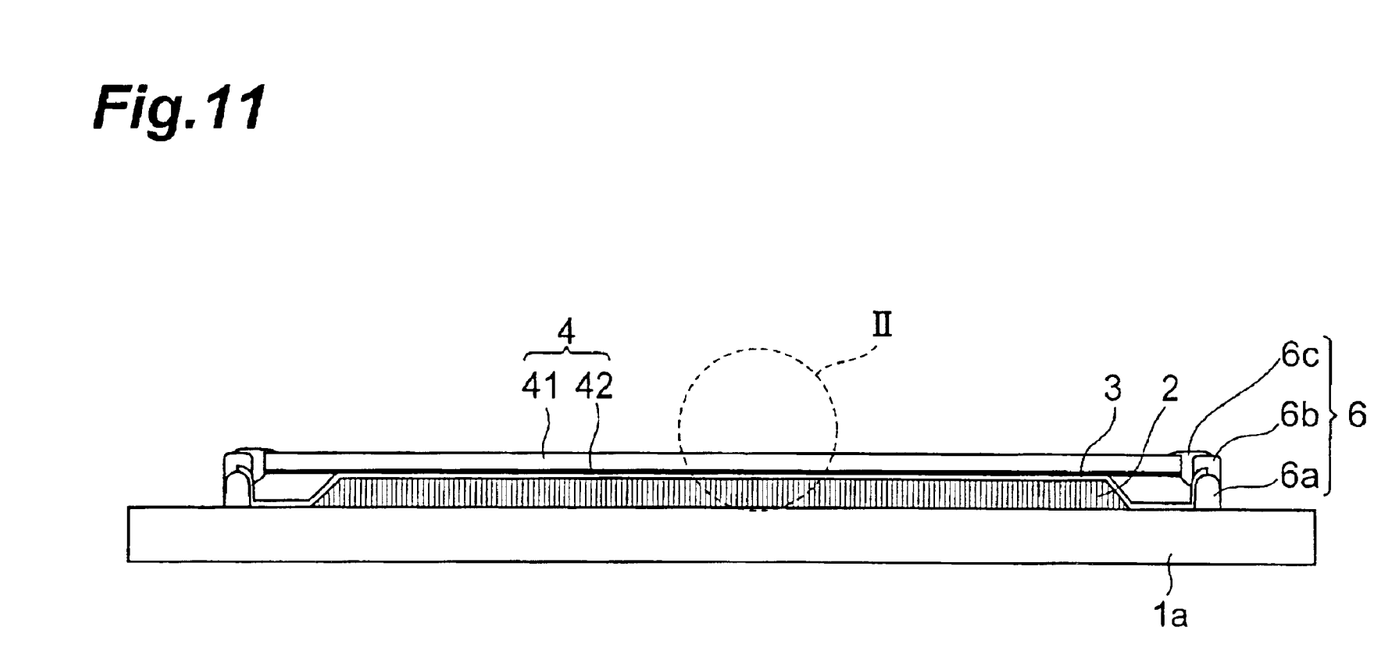
FIG. 11 is a cross-sectional view of a first embodiment of the scintillator panel according to the present invention.

FIG. 11 is a cross-sectional view of a first embodiment of the scintillator panel according to the present invention. This scintillator panel uses a light-transmittable substrate 1a instead of the solid imaging element 1 of the radiation image sensor shown in FIGS. 1 and 2, but is otherwise identical thereto. For the light-transmittable substrate 1a, a glass plate or a resin such as acrylic or the like may be used. The construction and placement of the radiation-transmittable plate and frame shown in FIGS. 4 through 10 may be applied to the scintillator panel shown in FIG. 11. The radiation image sensor according to the present invention can be constructed through the combination of this scintillator panel with a television camera or the like.

Industrial Applicability

The radiation image sensor or scintillator panel according to the present invention can be widely applied as an X-ray imaging apparatus for industrial or medical purposes.

What is claimed is:

1. A radiation image sensor comprising:
   an image sensor having a plurality of light receiving elements arranged one or two dimensionally;
   scintillator having columnar structure and formed on the light-receiving surface of said image sensor to convert radiation into light including wavelength bands that can be detected by said image sensor;
   a protective film formed so as to cover and adhere to said columnar structure of scintillator;
   a frame disposed around the scintillator to set a separation distance from the scintillator and fix the protective film onto the image sensor; and
   a radiation-transmittable plate fixed opposite to said image sensor by said frame to sandwich the protective film therebetween.

2. The radiation image sensor according to claim 1, characterized in that openings are formed in part of the area between said frame and said radiation-transmittable plate.

3. The radiation image sensor according to claim 1 or claim 2, characterized in that said radiation-transmittable plate reflects the light emitted by said scintillator.

4. The radiation image sensor according to claim 3, characterized in that said radiation-transmittable plate is a metal plate.

5. The radiation image sensor according to claim 3, characterized in that said radiation-transmittable plate has a reflective film reflecting the light emitted by said scintillator and formed on a radiation-transmittable substrate.

6. The radiation image sensor according to claim 5, characterized in that said reflective film comprises a metal film.

7. The radiation image sensor according to claim 6, characterized in that said radiation-transmittable substrate comprises a glass, resin or carbon-based substrate.

8. The radiation image sensor according to claim 5, characterized in that said radiation-transmittable substrate comprises a glass, resin or carbon-based substrate.

9. A scintillator panel comprising:
   a substrate;
   scintillator having a columnar structure and formed on said substrate to convert radiation into light that can pass through said substrate;
   a protective film formed so as to cover and adhere to said columnar structure of scintillator;
   a frame disposed around the scintillator to set a separation distance from the scintillator and fix the protective film onto the substrate; and
   a radiation-transmittable plate fixed opposite to said substrate by said frame to sandwich the protective film therebetween.

10. The scintillator panel according to claim 9, characterized in that openings are formed in part of the area between said frame and said radiation-transmittable plate.

11. The scintillator panel according to claim 9 or claim 10, characterized in that said radiation-transmittable plate reflects the light emitted by said scintillator.

12. The scintillator panel according to claim 11, characterized in that said radiation-transmittable plate is a metal plate.

13. A radiation image sensor comprising a scintillator panel according to claim 12 and a detector that detects optical images that have passed through said substrate.

14. The scintillator panel according to claim 11, characterized in that said radiation-transmittable plate has a reflective film reflecting the light emitted by said scintillator and formed on a radiation-transmittable substrate.

15. The scintillator panel according to claim 14, characterized in that said reflective film is a metal film.

16. The scintillator panel according to claim 15, characterized in that said radiation-transmittable substrate is a glass, resin or carbon-based substrate.

17. A radiation image sensor comprising a scintillator panel according to claim 16 and a detector that detects optical images that have passed through said substrate.

18. A radiation image sensor comprising a scintillator panel according to claim 15 and a detector that detects optical images that have passed through said substrate.

19. The scintillator panel according to claim 14, characterized in that said radiation-transmittable substrate is a glass, resin or carbon-based substrate.

20. A radiation image sensor comprising a scintillator panel according to claim 19 and a detector that detects optical images that have passed through said substrate.

21. A radiation image sensor comprising a scintillator panel according to claim 14 and a detector that detects optical images that have passed through said substrate.

22. A radiation image sensor comprising a scintillator panel according to any of claim 9 or 10 and a detector that detects optical images that have passed through said substrate.

23. A radiation image sensor comprising a scintillator panel according to claim 11 and a detector that detects optical images that have passed through said substrate.

* * * * *